Patented Aug. 19, 1941

2,252,723

UNITED STATES PATENT OFFICE 2,252,723

HALOGEN-ALKYL AMIDINES AND PROCESS OF PREPARING SAME

Karl Miescher and Willi Klarer, Riehen, and Ernst Urech, Basel, Switzerland, assignors, by mesne assignments, to Ciba Pharmaceutical Products, Incorporated, Summit, N. J., a corporation of New Jersey No Drawing. Application April 29, 1939, Serial No. 270,934. In Switzerland May 11, 1938

9 Claims. (Cl. 260—309)

This invention relates to the manufacture of new halogenalkylamidines by causing a halogen-carboxylic acid derivative to react with an amine.

The compounds thus obtained may be supposed to comprise the following structure:

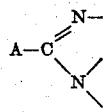

wherein A is a halogen-alkyl radical. These new amidines may be open chain compounds or cyclic compounds. In the latter case the two amidine nitrogen atoms are united together by an alkylene chain, as for instance in the imidazoline ring or the tetrahydropyrimidine ring.

Among the aforesaid acid derivatives are for example the imido ethers obtainable from the nitriles, the imido halides corresponding with the amides or the thioamides.

As amines there come into question primary or secondary mono-amines and diamines, for instance ammonia, saturated and unsaturated alkylamines, alkylenediamines, aralkylamines, aromatic or heterocyclic amines, for instance anilines, naphthylamines, aminopyridines, aminoquinolines, aminobenzthiazoles or the like. There may also be used however amines in which the nitrogen is cyclic-bound, for instance as in piperidine.

In the process of the invention the halogen group of the parent material does not participate in the reaction, which is surprising in view of its being possible for it to do so. On the contrary it has been found that the new amidines are produced very smoothly and this is further surprising since attempts to make trichlorolactic acid amidine has proved useless (compare Pinner, Die Imidoäther (1892), page 39).

The products of the invention are valuable intermediates for synthetic products, for example in the manufacture of pharmaceutical preparations.

The following examples illustrate the invention, the parts being by weight:

Example 1

157 parts of chloracetimidoethylether hydrochloride are added to an ice cooled solution of 60 parts of ethylenediamine in 800 parts of absolute alcohol whilst stirring well. After about ½ hour there is added a solution of 36 parts of hydrogen chloride in 500 parts of absolute alcohol and the mixture is heated gradually to room temperature. The ammonium chloride produced is filtered and the clear filtrate is evaporated and the residue recrystallized from a little hot absolute alcohol, whereby the 2-chloromethyl-imidazoline hydrochloride is precipitated in the form of colorless crystals melting at 185-190° C.

The reaction takes place in accordance with the following equation:

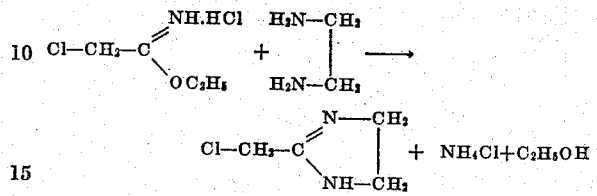

In similar manner the 2-bromomethyl-imidazoline may be made.

Example 2

185 parts of γ-chlorobutyroimidoethyl ether hydrochloride (obtainable by the action of hydrogen chloride on a mixture of equivalent quantities of γ-chlorobutyronitrile and ethyl alcohol) are introduced whilst cooling and stirring into a mixture of 60 parts of ethylenediamine and 400 parts of absolute alcohol. There is then added a solution of 36 parts of hydrogen chloride in 360 parts of absolute alcohol and the mixture is further worked up as described in Example 1. By recrystallization from a mixture of alcohol and ether the 2-(γ-chloropropyl)-imidazoline hydrochloride is obtained in a pure state; it melts at 145° C.

The reaction takes place according to the following equation:

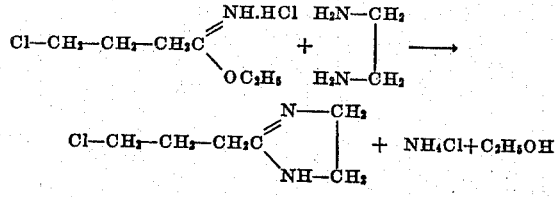

Example 3

15.7 parts of chloracetimidoethylether hydrochloride are introduced while cooling well into an alcoholic solution of 8.5 parts of piperidine and the mixture is shaken for some time, whereby the components are brought into solution. The solvent is then distilled in a vacuum and the residue extracted several times with acetone. The insoluble portion is the chloracet-piperidine-amidine hydrochloride of melting point 176° C.

The reaction takes place according to the following equation:

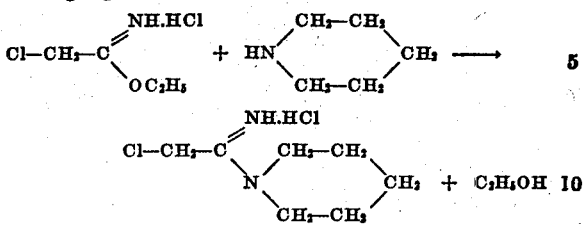

Instead of the chloracetimidoethylether there may be used another ether.

What we claim is:
1. 2-(chloromethyl)-imidazoline forming a hydrochloride of melting point 185-190° C.
2. A process for the manufacture of halogenalkylamidines, which comprises causing an imido-ether of a halogen-containing lower aliphatic acid to react with an amine containing at least one hydrogen atom attached to the nitrogen atom.
3. A process for the manufacture of halogenalkylamidines, which comprises causing an imido-ether of a halogen-containing lower aliphatic acid to react with a diamine containing at least one hydrogen atom attached to the nitrogen atom.
4. A process for the manufacture of chloromethylimidazoline, which comprises causing a chloroacetic acid imidoether to react with ethylenediamine.
5. The compounds of the formula

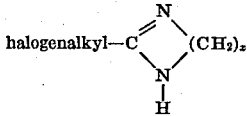

wherein $x$ represents an integer selected from the group consisting of 2 and 3.

6. The compounds of the formula

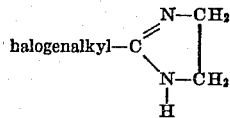

7. The compounds of the formula

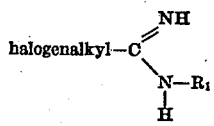

wherein $R_1$ represents a member of the group consisting of hydrogen, alkyl, aryl, aralkyl and a heterocyclic radical.

8. The compounds of the formula

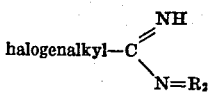

wherein $R_2$ represents a chain of —$CH_2$ groups, the terminal members of which are attached to the N-atom of the —$N=R_2$ group.

9. The compounds of the formula halogenalkyl —X wherein X represents a radical selected from the group consisting of

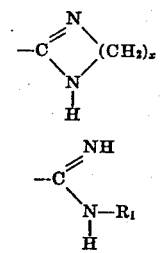

and

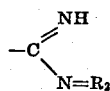

$x$ representing an integer from the group consisting of 2 and 3, $R_1$ a member of the group consisting of hydrogen, alkyl, aryl, aralkyl and a heterocyclic radical, and $R_2$ a chain of —$CH_2$ groups whose terminal members are attached to the N-atom of the —$N=R_2$ group.

KARL MIESCHER.
WILLI KLARER.
ERNST URECH.